United States Patent [19]

Okamoto et al.

[11] Patent Number: 5,776,533
[45] Date of Patent: Jul. 7, 1998

[54] PROCESS AND APPARATUS FOR PREPARING PRECUT SOLID WATER-IN-OIL EMULSION

[75] Inventors: Kiyotaka Okamoto; Yoshihiko Honda, both of Sapporo; Mototake Murakami, Sayama; Shigeru Oniki, Kawakami-gun; Koji Suzuki, Kawagoe, all of Japan

[73] Assignee: Snow Brand Milk Products Co., Ltd., Hokkaido, Japan

[21] Appl. No.: 750,120

[22] PCT Filed: Mar. 12, 1996

[86] PCT No.: PCT/JP96/00607

§ 371 Date: Mar. 6, 1996

§ 102(e) Date: Mar. 6, 1996

[87] PCT Pub. No.: WO96/29859

PCT Pub. Date: Oct. 3, 1996

[30] Foreign Application Priority Data

Mar. 29, 1995 [JP] Japan .................. 7-071348

[51] Int. Cl.[6] .............. A23C 15/00; A23P 1/00; B29C 43/00
[52] U.S. Cl. .............. 426/515; 99/537; 264/142; 425/218; 425/412; 425/422; 425/577; 426/512

[58] Field of Search .............. 426/515, 518, 426/512; 425/218, 256, 412, 422, 577; 249/52; 264/142; 99/537

[56] References Cited

U.S. PATENT DOCUMENTS 4,276,318  6/1981  Orlowski et al. .......... 425/422
5,082,681  1/1992  Barlow et al. ............ 426/512

Primary Examiner—George Yeung
Attorney, Agent, or Firm—Griffin, Butler, Whisenhunt & Szipl

[57] ABSTRACT

Precut, solid water-in-oil emulsion compositions are prepared by providing a mold having an outer frame and a plurality of configured partitioning plates disposed within the outer frame. The mold is at least partially filled with a fluid form of the emulsion so as to form precuts in the emulsion corresponding to the partitioning plates. The emulsion is then allowed to set. An extrusion die is advanced into the mold. The extrusion die has grooves configured complimentary to the configuration of the partitioning plates so as to receive the partitioning plates therein. The set emulsion is then discharged from the mold by at least partially passing the extrusion die through the mold so as to discharge the set emulsion with the precuts therein.

23 Claims, 17 Drawing Sheets

Fig. 1
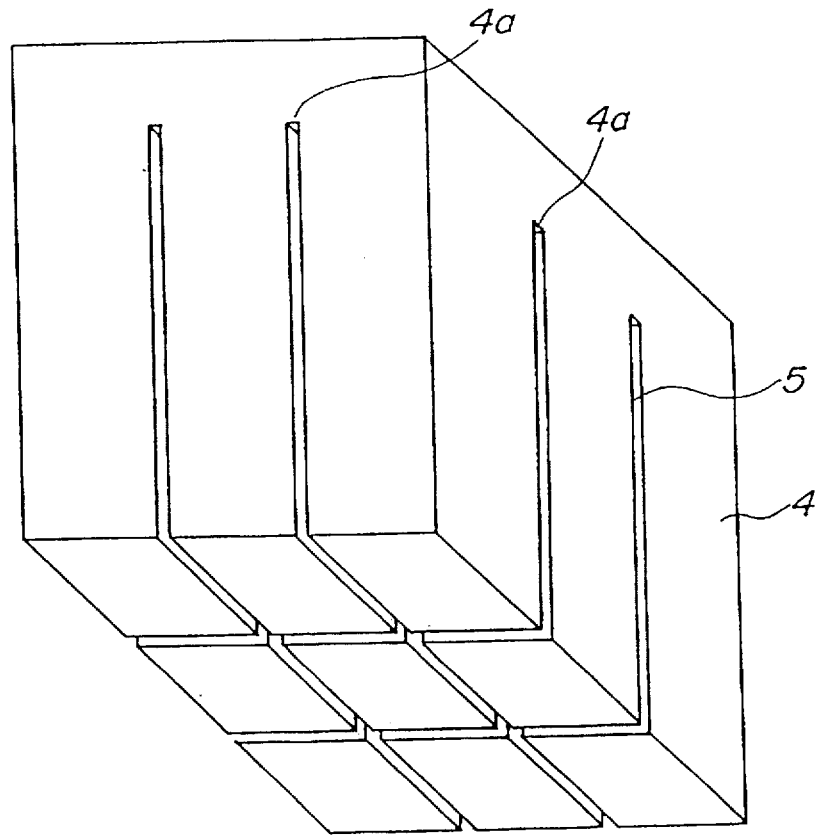
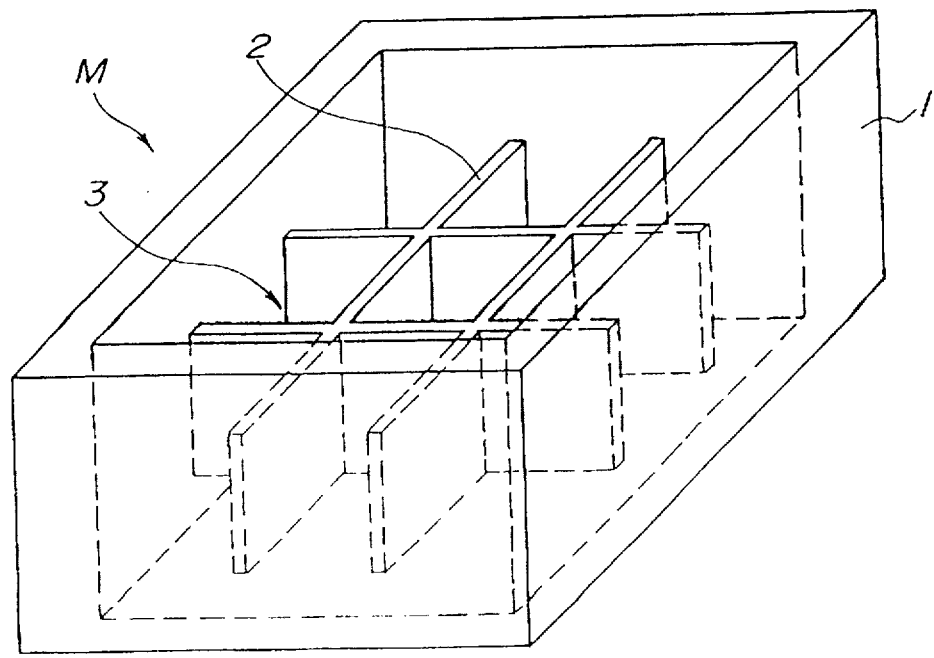

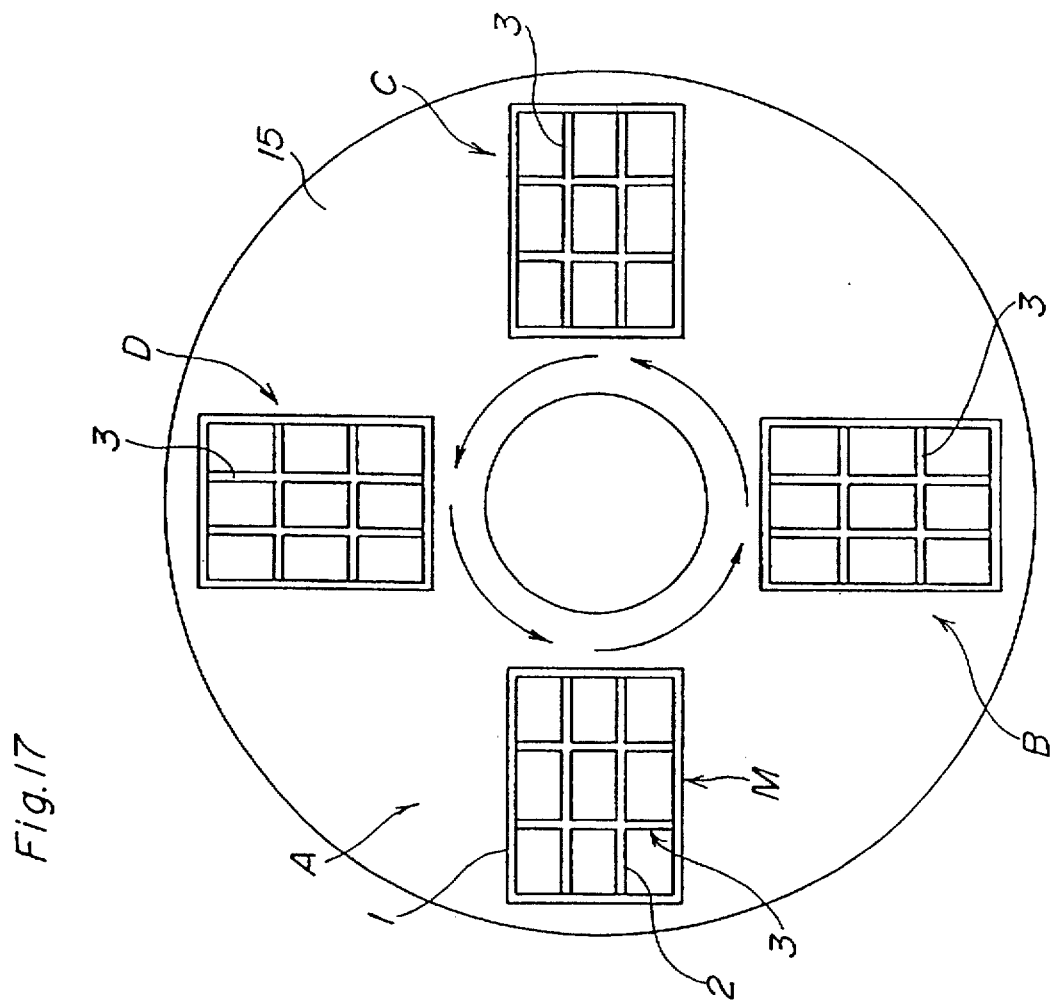
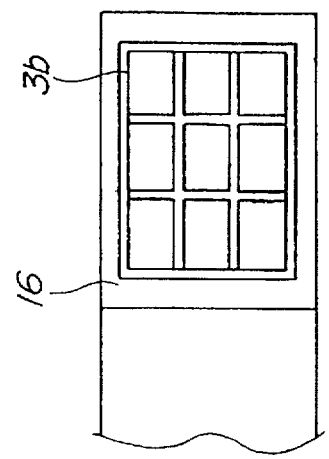
Fig. 17

PROCESS AND APPARATUS FOR PREPARING PRECUT SOLID WATER-IN-OIL EMULSION

BACKGROUND OF THE INVENTION

1. Field of the Invention

The present invention relates to a process for preparing precut fat or oil food in a water-in-oil type emulsion form (referred to hereinafter simply as fat or oil food in emulsion form) by filling fluid fat or oil food in emulsion form such as butter, margarine or spread into a mold having a partitioning frame and also to an apparatus therefor. A product of fat or oil food in emulsion form prepared according to the inventive process can be readily divided along the preformed cuts even if the product is at a relatively low temperature, e.g. immediately after it has been taken out from a refrigerator or even in a frozen state. Accordingly, the invention provides the product which is useful as table fat or oil or cooking fat or oil for household consumption or as fat or oil as raw material for commercial consumption.

2. Prior Art

Fat or oil food in emulsion form such as butter, margarine or spread for household use is packaged typically in a unit weight in order of 112.5 g–450 g and usually maintained at a refrigeration temperature of approximately 5° C. during its storage or transport.

While the fat or oil food in emulsion form is soft and fluid immediately after it has been prepared, glyceride contained therein is solidified upon cooling and results in rapid increase of its hardness. Accordingly, the food presents the state of a hard block immediately after it has been taken out from the refrigerator. The block is too hard to be easily divided or partially cut off to be used. Particularly in the case of hard type butter or margarine characterized by its high solid fat content index (SFI), the food of this type is usually left for a period at a room temperature until it becomes sufficiently soft enough to be easily divided. However, such preheating before the division of the food results in poor working efficiency and, even when the remaining portion of the food is cooled and stored again, the deterioration in quality is unavoidable because the surface and other portions have been melted.

Fat or oil commercially consumed in the field of confectionery or baking typically to be kneaded into dough is conventionally frozen into a unit block in order of 10~30 kg for storage. Also in the case of such commercially consumed fat or oil, it is a usual practice to preheat the block before the portion to be used can be cut off from this block. Such practice inevitably results in poor working efficiency.

To solve the problems as have been described above, there have already been proposed various processes for precutting butter or margarine adapted to be readily divided along the preformed cuts.

For example, there has been disclosed the precut sheet-like butter having V-shaped cuts preformed on one surface thereof along which the sheet-like butter can be divided for use (Japanese Utility Model Application Disclosure Gazette No. 136180/1987). The process and the apparatus for precutting margarine or the like has been also disclosed (Japanese Patent Publication Gazette No. 17314/1990). According to this disclosure, the flow of margarine or the like to be processed is guided through the combing blades provided adjacent to the outlet of the nozzle to form an appropriate number of longitudinal cuts extending along the flow of the fluid margarine or such. Thereafter, the transverse cuts are additionally formed at appropriate intervals by a plurality of blades provided transversely to the flow of the fluid margarine or the like. In addition, the process for precutting margarine shape-stabilized at a temperature in a range of 5°~45° C. has been disclosed (Japanese Patent Publication Gazette No. 27812/1992). According to this disclosure, the cuts are pre-formed on the food at appropriate intervals in longitudinal, transverse and oblique directions leaving a portion of the thickness cut-free so as to be dividable into appropriately shaped small pieces.

All the processes for precutting the fat or oil foods in emulsion form disclosed by these Japanese Utility Model Application Disclosure Gazette No. 136180/1987, Patent Publication Gazette No. 17314/1990 and Patent Publication Gazette No. 27812/1992 relate to the preparation of sheet-like fat or oil foods to be kneaded into dough for the preparation of cake or bread. These processes are all similar to each other in that the nozzle through which the fat or oil food in emulsion form is extruded is provided at its forward end with the cutter or combing blades. After the longitudinal cuts have been formed by these cutter or combing blades, the transverse cuts are formed as the food is conveyed by the belt conveyor.

However, table fat or oil and cooking fat or oil for household use are available usually in the form of blocks and the process for precutting the sheet-like fat or oil foods in emulsion form is not applicable thereto. Specifically, the block-like fat or oil food in emulsion form has a thickness (i.e., a height) 3~5 times the average thickness of sheet-like fat or oil foods in emulsion form. It is assumed for the block-like food that the longitudinal cuts are formed by using the cutter or combing blades provided on the forward end of the nozzle and then the transverse cuts are formed as the food is conveyed by the belt conveyor. Said thickness will prevent said transverse cuts from being formed exactly in vertical direction. Consequently, the resultant shape and weight of the block-like fat or oil food in emulsion form may become uneven.

It is impossible particularly for the commercially consumed block-like fat or oil to employ the above-mentioned process for precutting because the block is substantially thicker.

Studying the process for precutting a block of fat or oil food in emulsion form and the apparatus therefor, the inventors found that the problems as have been described above can be solved by adopting a mold provided therein with a partitioning frame. The invention is based on this finding.

SUMMARY OF THE INVENTION

Thus, it is the principal object of the invention to spit provide a process for preparing fat or oil food in emulsion form comprising steps of filling fluid fat or oil food in emulsion form into a mold provided therein with a partitioning frame and discharging it from the mold by an extrusion die having a configuration corresponding to said partitioning frame of the mold and an apparatus therefor.

According to the invention, fluid fat or oil foods in emulsion form such as butter, margarine and spread are used as starting materials. It should be understood that such starting materials include fat or oil food in emulsion form which is fluid at the product temperature immediately after its preparation. Such starting materials include also fat or oil food in emulsion form which was cooled in a block-like state but has been fluidized upon processing by a butter homogenizer or the like.

The fat or oil food in emulsion form thus fluidized is filled into the mold provided therein with the partitioning frame comprising a plurality of partitioning plates. The outer frame defining the mold may have its inner peripheral shape selected from, for example, a quadrilateral such as square, rectangle or trapezoid, and a polygon such as triangle, and a closed curve composed of a straight line and a curve such as sector. The partitioning frame provided within the mold may be arranged so as to define a desired shape of each partition selected from various shapes, for example, square, rectangle, trapezoid and triangle, as in the case of the mold, so far as a plurality of partitions are provided by the partitioning plates. Connection of the nozzle to the mold may be implemented by mounting the nozzle configured substantially in conformity with the outer frame of the mold on the bottom or the top of the mold in close contact with each other.

The height of the partitioning frame may be equal to or lower (shorter) than that of the outer frame of the mold. When the partitioning frame has the same height as that of the mold, the partitioning frame is assembled to the mold so that the upper and lower ends of these two components may be aligned with each other. Such arrangement allows the fat or oil food in emulsion form filled into the mold to be formed with the precuts fully extending from the top to the bottom thereof. When the height of the partitioning frame is shorter than that of the mold, the partitioning frame is assembled to the mold at the location shifted inward from the upper end or the lower end of the mold. Such arrangement allows the fat or oil food in emulsion form to have a precut-free portion adjacent to its upper or lower end.

The mold provided therein with the partitioning frame in the manner as has been described above is filled with the fluid fat or oil food in emulsion form. Then the fat or oil food in emulsion form, now having the precuts formed by the partitioning frame, is transferred together with the mold from the filling station to the discharging station by transfer means such as a slide plate or a turntable. During this transfer, an excessive portion of the fat or oil food in emulsion form bulging out from the bottom of the mold is leveled off by using a thin board or the like to make the mold content uniform. The fat or oil food in emulsion form having its quantity made uniform is then discharged from the mold by an extrusion die. The extrusion die is provided with grooves arranged in the same configuration as said partitioning frame and adapted to receive the partitioning plates in the direction of extrusion. The upper end of the fat or oil food in emulsion form is leveled off in a plane perpendicular to the direction of extrusion by a wire cutter means such as a piano wire, as the fat or oil food in emulsion form is discharged from the mold.

The outer peripheral shape of the extrusion die as a whole corresponds to the inner peripheral shape of the mold's outer frame. The gap defined between the outer peripheral wall of the extrusion die and the inner peripheral wall of the mold is preferably adjusted to be as narrow as possible so that these two walls may be slidably contacted by each other. It is also important to define the width of said grooves provided in the extrusion die to receive partitioning plates of the mold so that the gap defined between each partitioning plate and the adjacent groove wall may be maintained as narrow as possible.

While the extrusion die can be extruded either from above or from below, the mold, the process can be advantageously simplified when it is extruded from above the mold to discharge the fat or oil food in emulsion form directly onto wrapping paper or the like.

Now the relative position of the mold and the extrusion die established when the extrusion die is provided above the mold and the fat or oil food in emulsion form is filled into the mold from below will be discussed.

When the partitioning frame lower than the height of the outer frame of the mold is assembled to the mold with the lower end of said partitioning frame lying at the location shifted upward from the lower end of the mold, a difference in level is defined between the lower end of the partitioning frame and the lower end of the mold. A butter pump or the like is actuated to feed the fat or oil food in emulsion form through the nozzle into the mold immediately after the bottom of the extrusion die has reached the bottom of the mold. The extrusion die serves as a top plate and is progressively forced up as the fat or oil food in emulsion form is filled into the mold. When a predetermined quantity has been filled into the mold, the mold thus filled with the fat or oil food in emulsion form is transferred from the filling station to the discharging station. During this transfer, the excessive portion of the fat or oil food in emulsion form bulging out from the bottom of the mold is leveled off by the thin board or the like to make the mold content uniform. At the discharging station, the fat or oil food in emulsion form is discharged from the mold by the extrusion die, then its top end is leveled off by a wire cutter means such as a piano wire and placed on wrapping paper laid below the mold. The mold from which the fat or oil food in emulsion form has been discharged and the extrusion die associated therewith automatically return to the filling station and the process as has been mentioned above is repeated.

BRIEF DESCRIPTION OF THE DRAWINGS

The invention will be more fully understood with consideration to the specific embodiments described in detail with reference to the accompanying drawings, in which:

FIG. 1 is an exploded perspective view exemplarily showing a combination of extrusion die and mold according to the invention;

FIG. 17 is a diagram illustrating the molds placed on a turning table as viewed from above the top of the inventive apparatus;

THE MOST PREFERRED EMBODIMENT OF THE INVENTION

Figure 2:
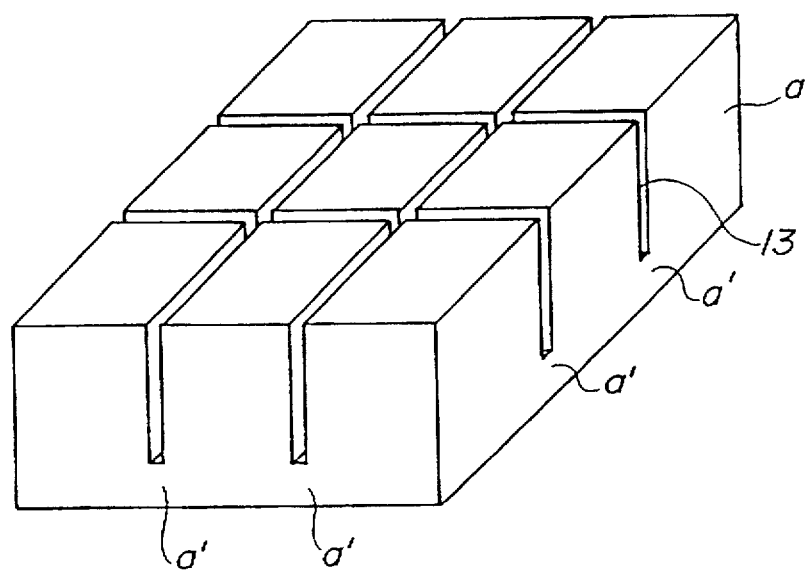
FIG. 2 is a perspective view exemplarily showing the product obtained by using these extrusion die and mold.

Details of the invention will be better understood from the following description of several embodiments described below.

Referring to FIG. 1, a mold (M) comprises an outer frame (1) and a partitioning frame (3) arranged inside said outer frame (1) by a plurality of partitioning plates (2) in parallel crosses. An extrusion die (4) is provided with grooves (5) adapted to receive the partitioning plates (2) of the partitioning frame (3) as the extrusion die (4) is advanced.

The partitioning frame (3) is shown by FIG. 1 to be lower than the outer frame (1).

Figure 3:
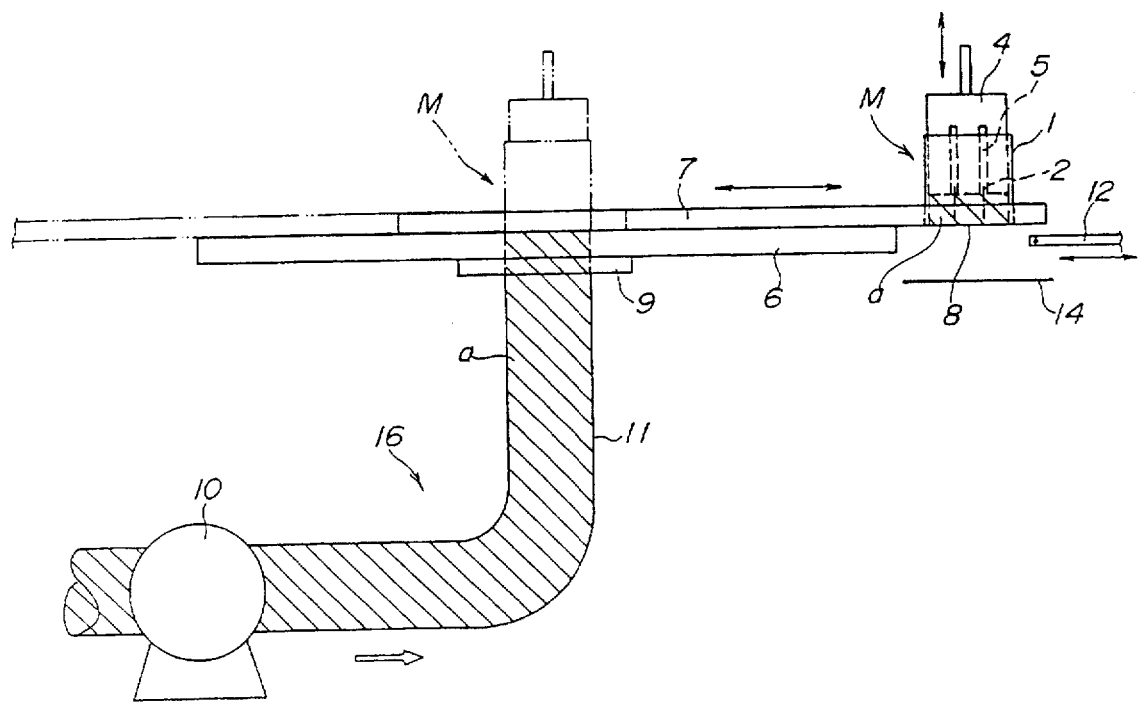
FIG. 3 is a schematic side sectional view illustrating a step of the inventive process during which the mold is transferred by a slide plate.

To obtain a product shown by FIG. 2 by using such mold (M), the mold (M) is placed on a slide plate (7) which is, in turn, slidably moved on a stand (6), as will be apparent from FIG. 3.

The slide plate (7) is provided with a filling port (8) dimensioned in conformity with a bottom of the mold (M) and a nozzle (9) is provided on a lower side of the stand (6) in alignment with said filling port (8). Fat or oil food in emulsion form is fed by a feed pump (10) to the nozzle (9) via a pipe (11).

Figure 4:
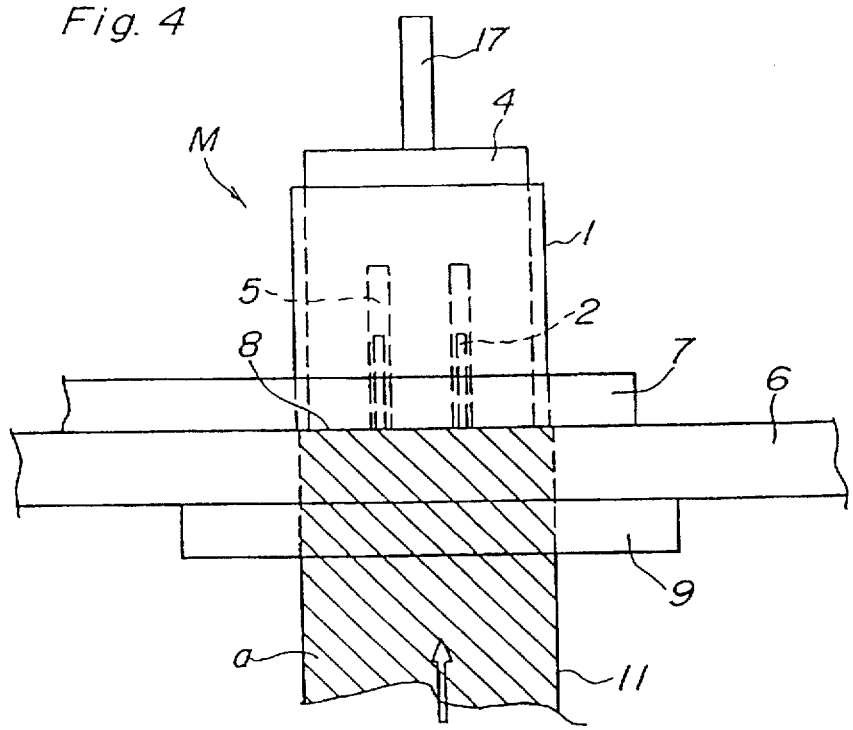
FIG. 4 is a schematic side sectional view illustrating the position taken by the inventive apparatus immediately before the mold is filled with fat or oil food in emulsion form.
Figure 5:
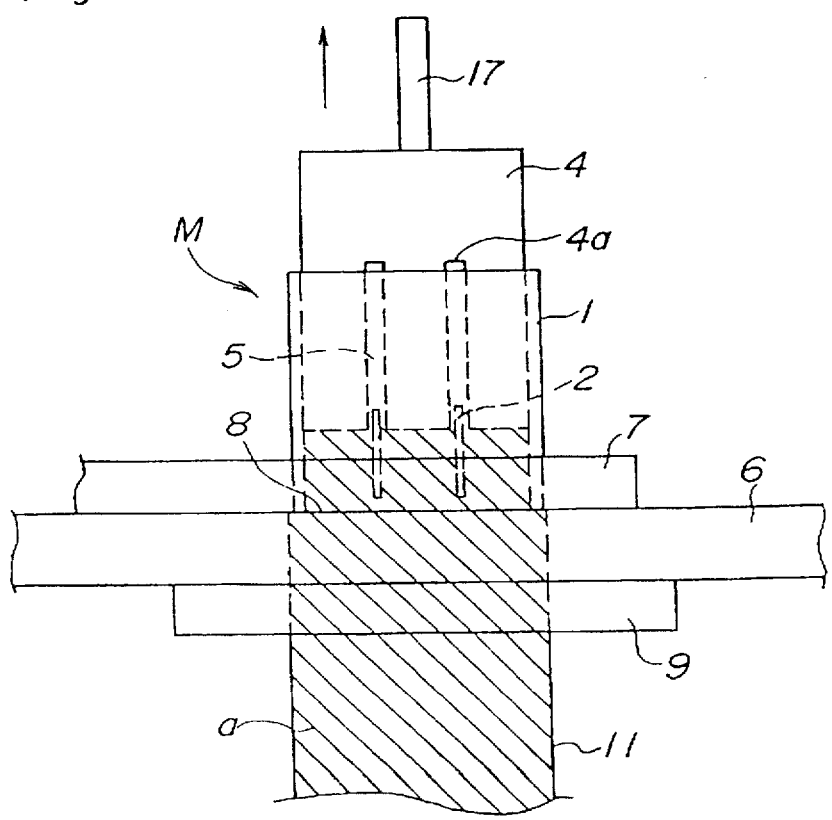
FIG. 5 is a schematic side sectional view illustrating the position taken by the inventive apparatus immediately after the mold has been filled with fat or oil food in emulsion form.
Figure 6:
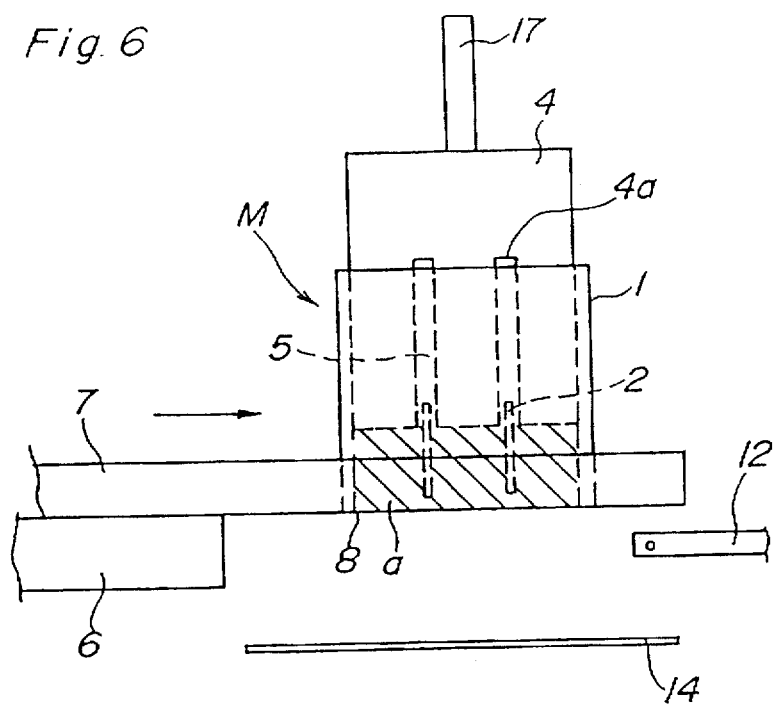
FIG. 6 is a schematic side sectional view illustrating the position taken by the inventive apparatus immediately after the mold filled with fat or oil food in emulsion form has been transferred to a discharging station.

Referring to FIG. 4, the extrusion die (4) serving as a top plate is progressively force up as fat or oil food in emulsion form is fed from the nozzle (9) through the filling port (8) of the slide plate (7) into the mold (M). The mold (M) having been filled with a predetermined quantity of fat or oil food in emulsion form is transferred by the slide plate (7) from a filling station shown by FIG. 5 to a discharging station shown by FIG. 6. During this transfer, the excessive quantity of fat or oil food in emulsion form bulging out from the mold bottom is leveled off by the stand (6) to make the mold content uniform.

Figure 7:
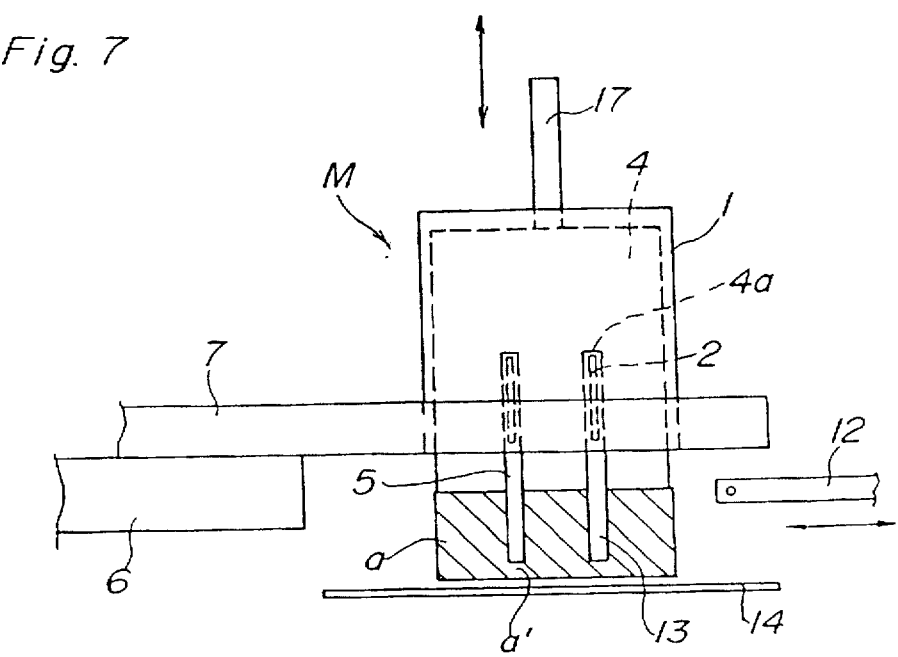
FIG. 7 is a schematic side sectional view illustrating the inventive apparatus as it is discharging fat or oil food in emulsion form from the mold.

Referring to FIG. 7, the fat or oil food in emulsion form is extruded from the mold (M) as the extrusion die (4) descends and discharged onto wrapping paper (14) laid below the mold (M) after its top end has been leveled off by a wire cutter means (12) such as piano wire.

The mold (M) from which the fat or oil food in emulsion form has been discharged automatically returns together with the associated extrusion die (4) to the filling station in preparation for the next cycle of the process.

In this specific embodiment, the partitioning frame (3) lower than the outer frame (1) of the mold (M) is assembled to the mold (M) with the lower end of the frame (3) being positioned at a level shifted upward from the bottom of the mold (M). In other words, the partitioning frame (3) is assembled to the mold (M) so as to define a difference in level between the lower end of the frame (3) and the bottom of the mold (M).

Consequently, a product (a) is formed in its upper portion with cuts (13) arranged in parallel crosses, leaving a lower portion (a') having none of such cuts (13), as shown by FIG. 2.

In this embodiment, the partitioning frame (3) serves also as a stopper preventing the extrusion die (4) from fully descending within the mold (M). Accordingly, the grooves (5) of the extrusion die (4) terminate at an intermediate level(4a) between the heights of the partitioning frame (3) and the outer frame (1) of the mold (M).

The product (a) shown by FIG. 2 has cuts (13) not fully extending to its bottom and respective blocks partitioned by the frame (3) are not disjointed. This is for the reason that the height of the partitioning frame (3) is lower than the height of the mold (M). More specifically, the partitioning frame (3) is assembled to the outer frame (1) of the mold (M) at a location shifted inward from the bottom of the mold (M). As a result, the lower portion of the product shown by FIG. 2 is free from formation of the cuts (13).

Figure 20:
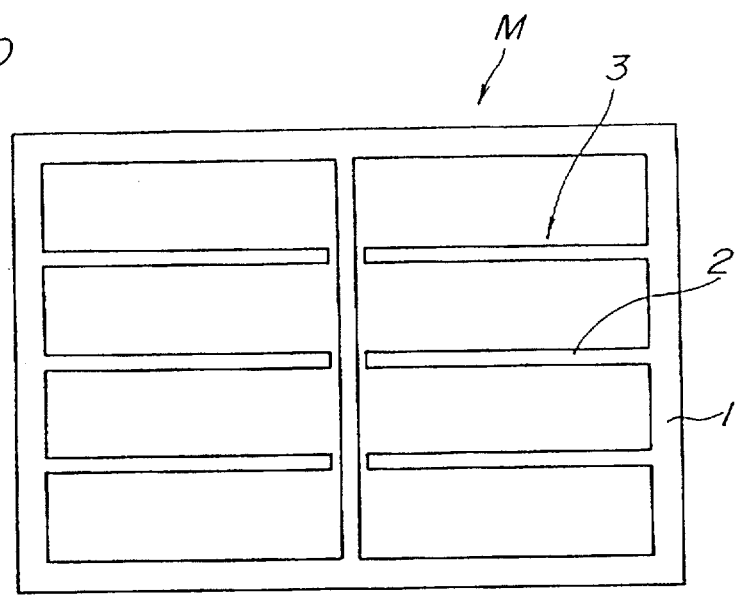
FIG. 20 is a horizontal sectional view showing the partitioning frame according to the invention.
Figure 21:
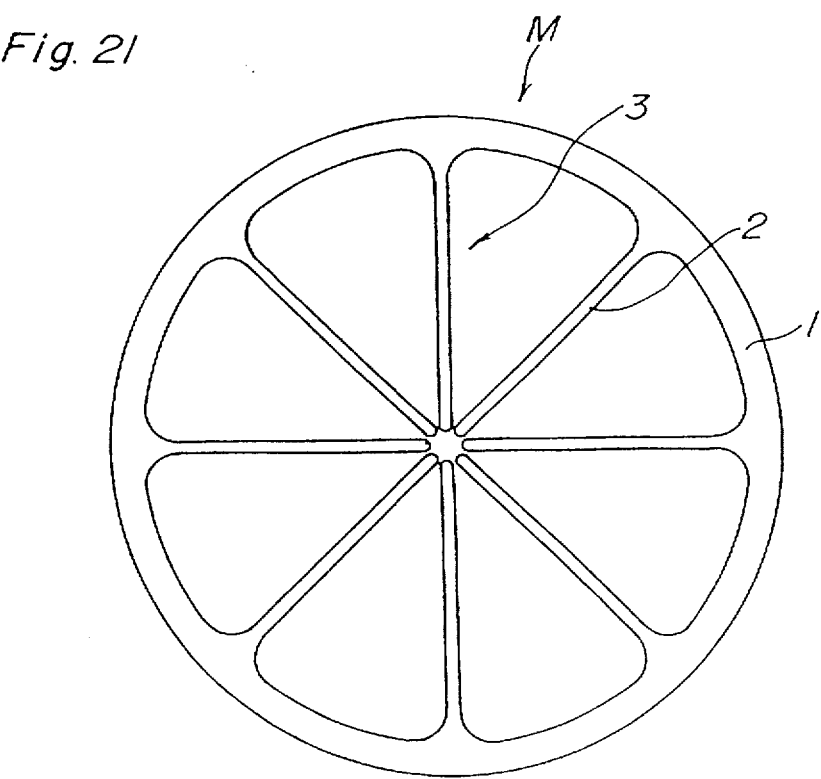
FIG. 21 is a horizontal sectional view showing a variant in the partitioning frame according to the invention.

Leaving a portion of the product free from formation of the precuts is achieved also by arranging the partitioning plates (2) in a special configuration. Specifically, the partitioning plates (2) extending from the outer frame (1) of the mold (M) may define interrupted lines as viewed in a section of the partitioning frame (3) taken along a plane perpendicular to the direction of extrusion, as shown by FIGS. 20 and 21. Particularly, the partitioning plates (2) may be thickened in the proximity of the outer frame (1) to stabilize the frame (2) during feed/discharge of the food and to facilitate the product to be easily divided in use.

While the partitioning plates (2) have been described above as they are of a same height, it is not essential to dimension all the partitioning plates (2) in a uniform height. For example, it is possible to dimension only several plates (2) in conformity with the height of the mold (M) Appropriate non-uniformity in the height of the plates (2) will be rather advantageous in some aspects. Namely, a variety is obtained in length as well as distribution of the precuts depending on the particular types of the product.

Depending on the position at which the nozzle is mounted, it is also possible to assemble the frame (3) to the outer frame (1) at a location shifted inward from the top of the mold (M). Such arrangement results in a product having its upper portion free from formation of the precuts (13) in contrast with the product shown by FIG. 2.

Connection of the nozzle (9) to the mold (M) is implemented by attaching the nozzle (9) having a shape substantially identical to the outer frame (1) of the mold (M) to top or bottom side of the mold (M). When it is desired to extrude the product directly onto wrapping paper (14) or the like, the extrusion is preferably performed from above so that the product may fall by its own gravity on wrapping paper (14) or the like. This is advantageous in simplifying the process.

When the frame (3) has the same height as that of the mold (M), the frame (3) is attached to the mold (M) so that the upper and lower ends of these two components may be aligned with each other. As a result, the product filled into the mold (M) can be provided with the precuts fully extending from the top to the bottom of this product.

The outer frame (1) of the mold (M) may have its inner peripheral shape selected from, for example, a quadrilateral such as square, rectangle or trapezoid, and a polygon such as triangle, and a closed curve composed of a straight line and a curve such as a sector. The partitioning frame (3) provided inside the mold (M) may be also arranged so as to define the partitions of a desired shape. As in the case of the mold, the shape may be selected from, for example, square, rectangle, trapezoid, triangle etc., so far as a plurality of partitions are formed by the partitioning plates.

Figure 8:
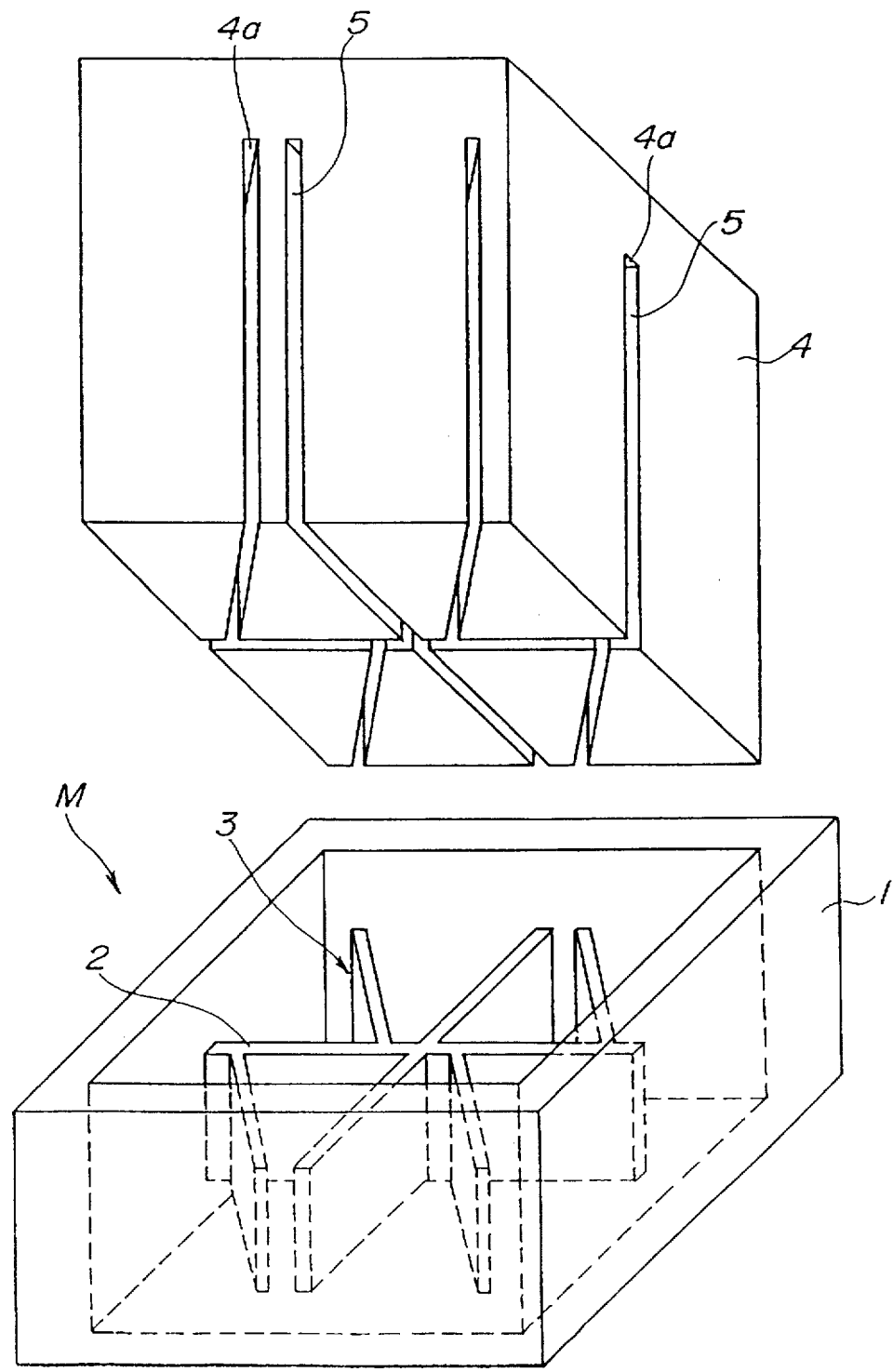
FIG. 8 is an exploded perspective view showing a variant in combination of extrusion die and mold according to the invention.
Figure 9:
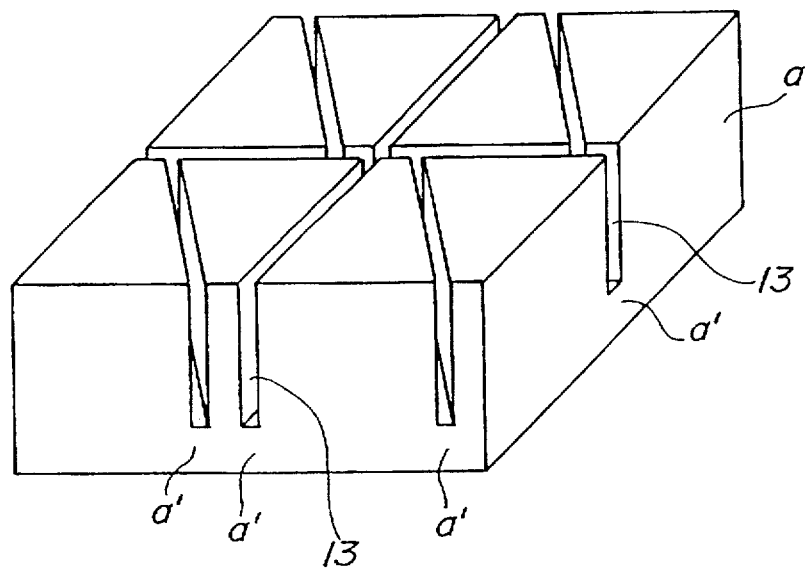
FIG. 9 is a perspective view showing the product obtained by using the combination of extrusion die and mold shown by FIG. 8.

A specific embodiment shown by FIG. 8 comprises the partitioning frame (3) formed by the partitioning plates (2) arranged so as to define the partitions individually shaped in a trapezoid. Such arrangement results in a product presenting the trapezoidal pillar-shaped partitions and leaving a portion (a') of its thickness free from formation of the precuts (13), as shown in FIG. 9.

Figure 10:
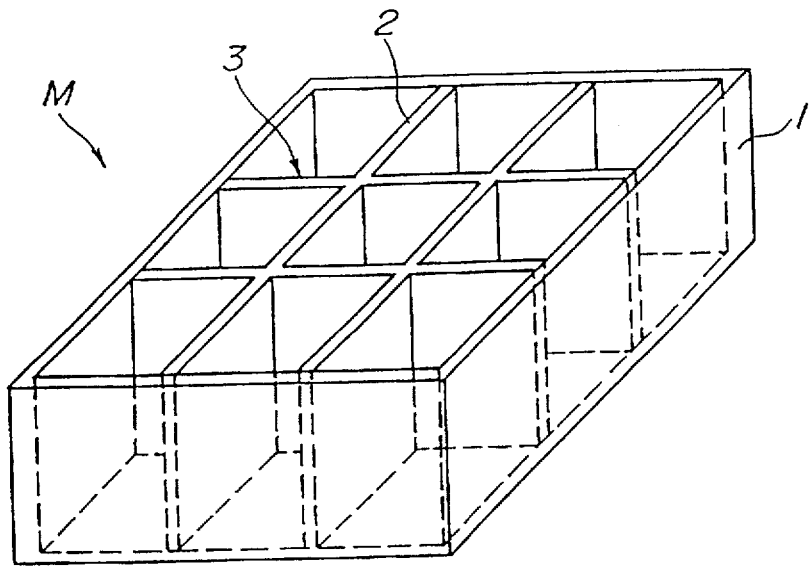
FIG. 10 is a perspective view showing a specific embodiment of the mold comprising an outer frame and a partitioning frame both dimensioned in a same height.
Figure 11:
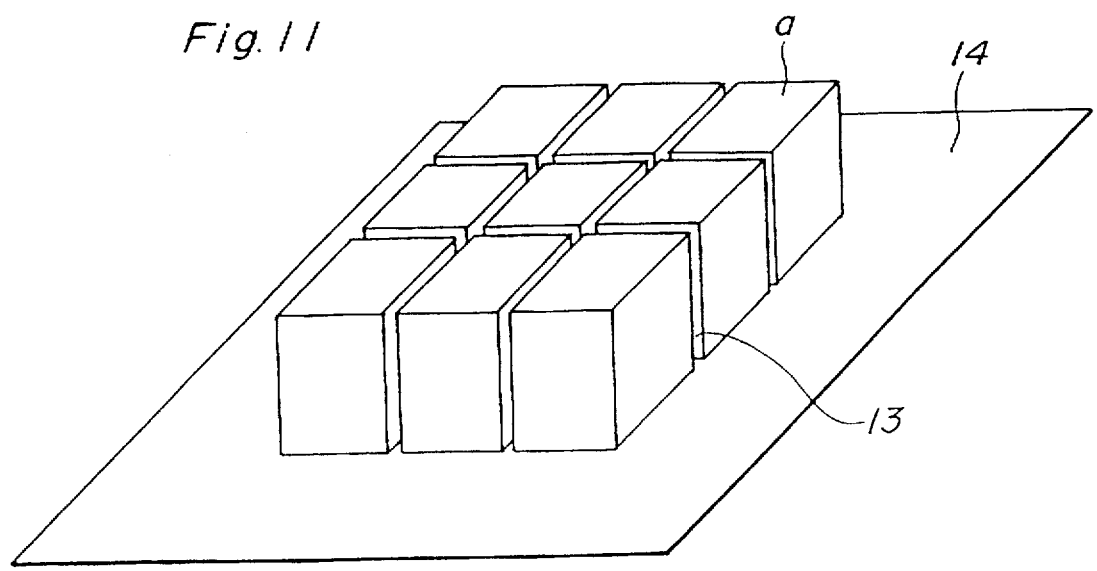
FIG. 11 is a perspective view showing the product obtained by using the mold shown by FIG. 10.

FIG. 10 shows the mold (M) with the outer frame (1) having the same height as the partitioning frame (3). Use of this mold (M) results in a product provided with the precuts (13) fully extending from the top to the bottom of the product as shown by FIG. 11.

The product provided with such fully extending precuts can be readily divided along the precuts even in its frozen state.

Conventionally it has been a practice to freeze the far or oil food in emulsion form for storage in the form of unit block weighing approximately 10~30 kg at a temperature in a range of −18°~−20° C. Accordingly, the block has had to be left at a room temperature in a range of 5°~15° C. for 10~20 days until it is completely preheated and thawed before use. The product provided with the precuts, on the other hand, can be completely preheated and thawed under the same temperature condition in approximately 3~5 days after frozen and divided, on the assumption that its total weight corresponds to the weight of said unit block.

Consequently, the working efficiency can be significantly improved and at the same time the utilizing efficiency of the refrigerator space is also improved. After the thawing process, the product obtained according to the invention can be used in the same manner as the conventional product which is frozen for storage in the form of a unit block. For example, the product obtained according to the invention can be kneaded into dough or the like as material fat or oil or as commercially consumed fat or oil in the field of confectionery or baking. It is also possible, if desired, to use the product after it has been rekneaded. The fat or oil food is in emulsion form and thus rekneaded can be processed to form a block weighing approximately 112.5~450 kg. Such block of fat or oil food in emulsion form may be provided with the precuts and offered as the table fat or oil or the cooking fat or oil for household use.

Figure 12:
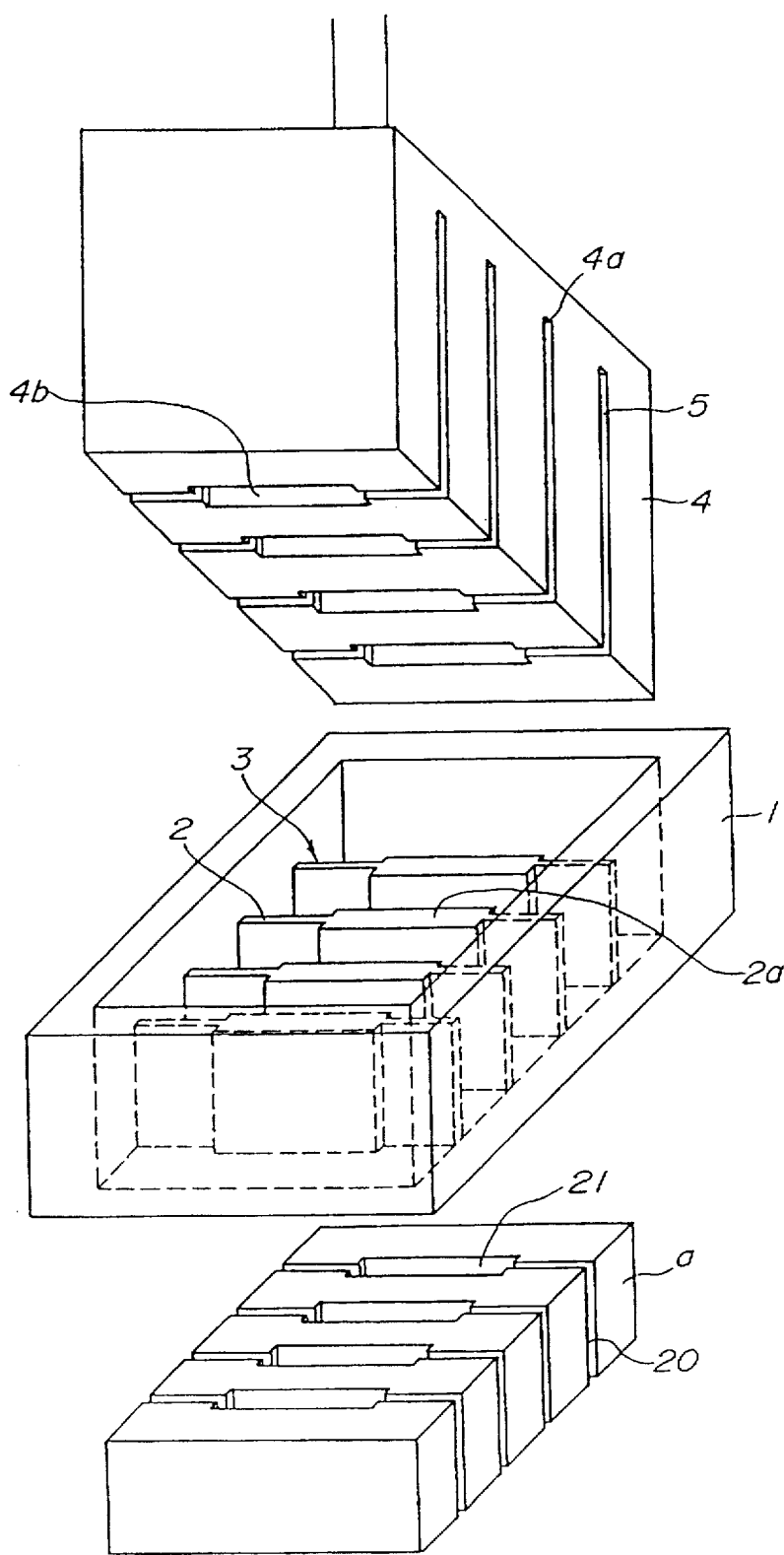
FIG. 12 is an exploded perspective view showing a product of fat or oil food in emulsion form having groove like cavities parallelly arranged in its longitudinally middle region to receive a knife edge inserted thereinto and a combination of extrusion die and mold used to prepare this product.

FIG. 12 shows a case in which a height of the partitioning frame (3) is lower than that of the outer frame (1) of the mold (M). A plurality of partitioning plates (2) are parallelly arranged inside the outer frame (1). Each of the partitioning plates (2) is formed at its longitudinally intermediate portion with a relatively thick prominence (2a) fully extending from top to bottom of this plate (2). The extrusion die (4) is correspondingly formed with grooves (5) adapted to receive the respective partitioning plates (2) of the partitioning frame (3). Accordingly, each of the grooves (5) is formed with a cavity (4b) adapted to receive said prominence (2a).

Bottoms (4a) of the grooves (5) lie at a level still leaving a partial thickness of the extrusion die and serve as stoppers for the extrusion die (4) being descended by resting on the upper ends of the respective partitioning plates (2). Consequently, the product (a) as illustrated below the mold (M) is obtained as the fat or oil food in emulsion form is extruded by the extrusion die (4) from the mold (M). This product (a) has precuts or splits (20) fully extending from its upper end to its lower end and intermediate length of each split (20) defines a relatively wide cavity (21).

Figure 13:
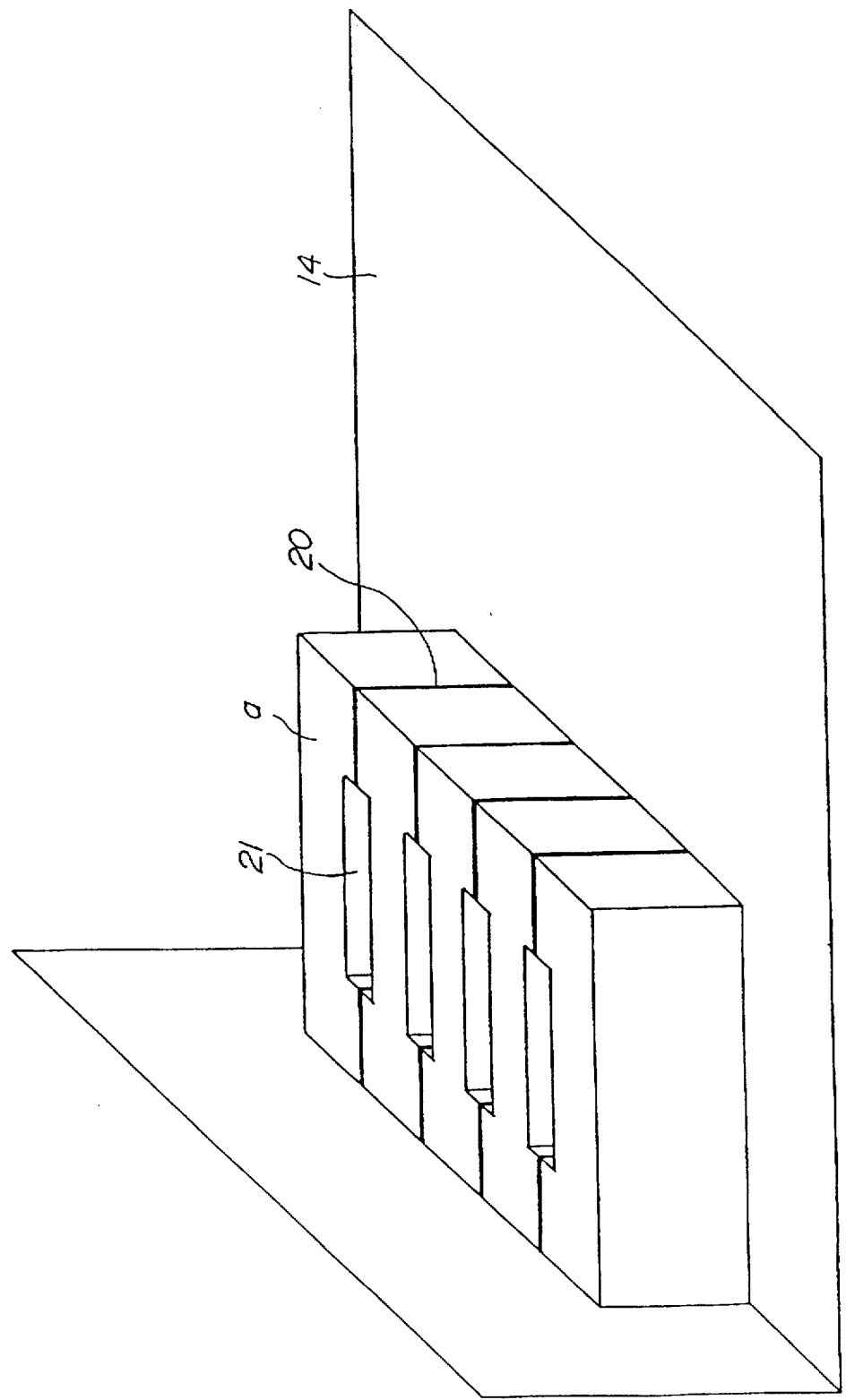
FIG. 13 is a perspective diagram illustrating the manner in which the product shown by FIG. 12 is packaged with wrapping paper.

When the product (a) is placed on wrapping paper (14) and packaged therewith, the respective partitions of the product (a) are put closely one to another so that the splits (20) are practically invisible, as shown by FIG. 13. Packaging in such manner is effective to prevent the product (a) from being disjointed during storage.

In use, the product can be readily divided by inserting a knife or the like into the cavity (21) after the product has been unwrapped.

Figure 14:
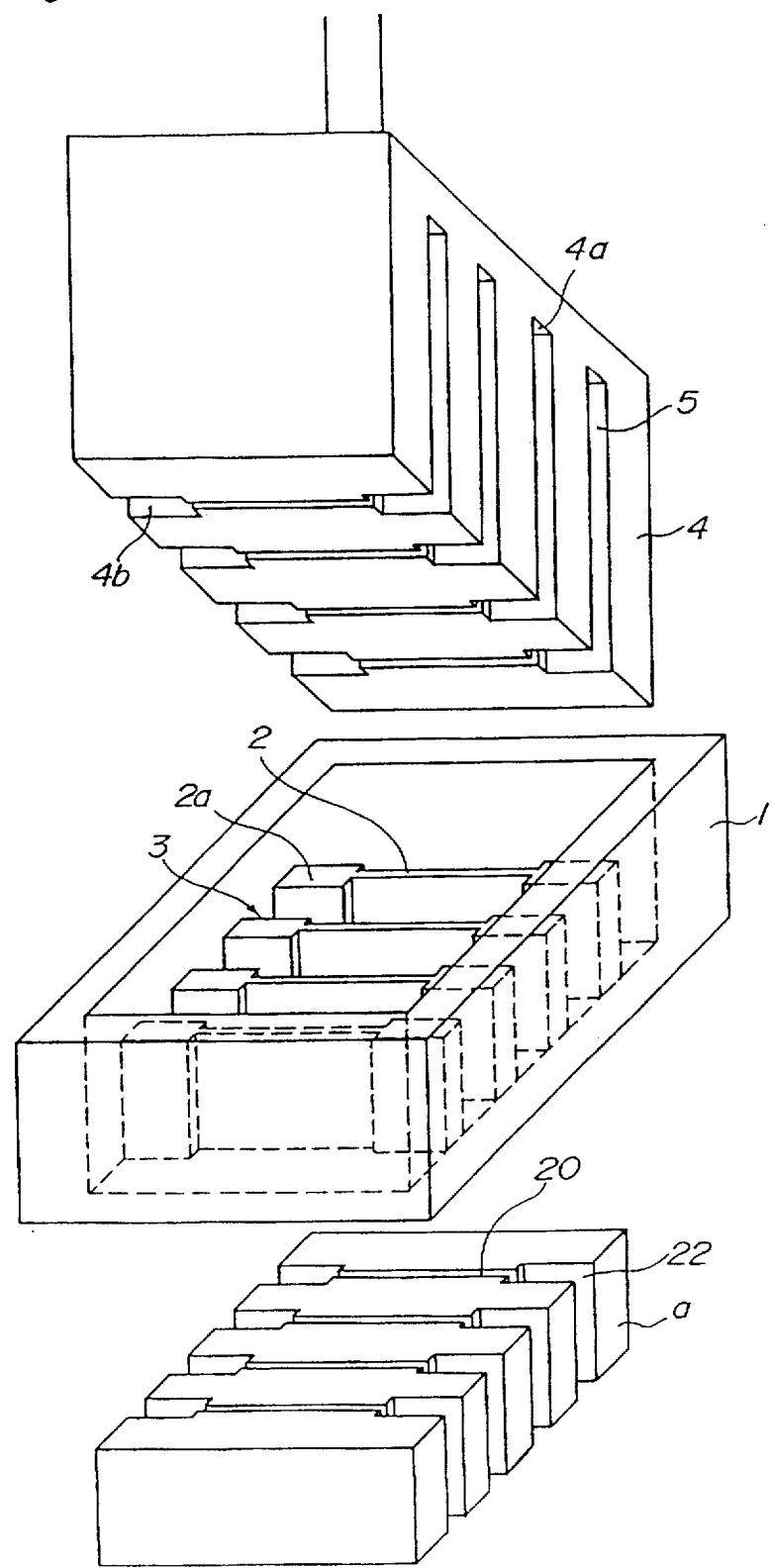
FIG. 14 is an exploded perspective view showing a product of fat or oil food in emulsion form having groove-like cavities parallelly arranged on transversely opposite sides adapted to receive a knife edge and a combination of extrusion die and mold used to prepare this product.

The mold (M) shown by FIG. 14 is similar to the mold (M) shown by FIG. 12 except that each partitioning plate (2) is provided at its transversely opposite ends with a relatively thick prominence (2a) fully extending from the upper end to the lower end of the partitioning plate (2).

This mold (M) provides a product (a) having relatively wide grooves (22) vertically extending in transversely opposite surfaces of the product (a) and the splits (20) extending between the respective pairs of such grooves (22), as will be seen in lower portion of FIG. 14.

Figure 15:
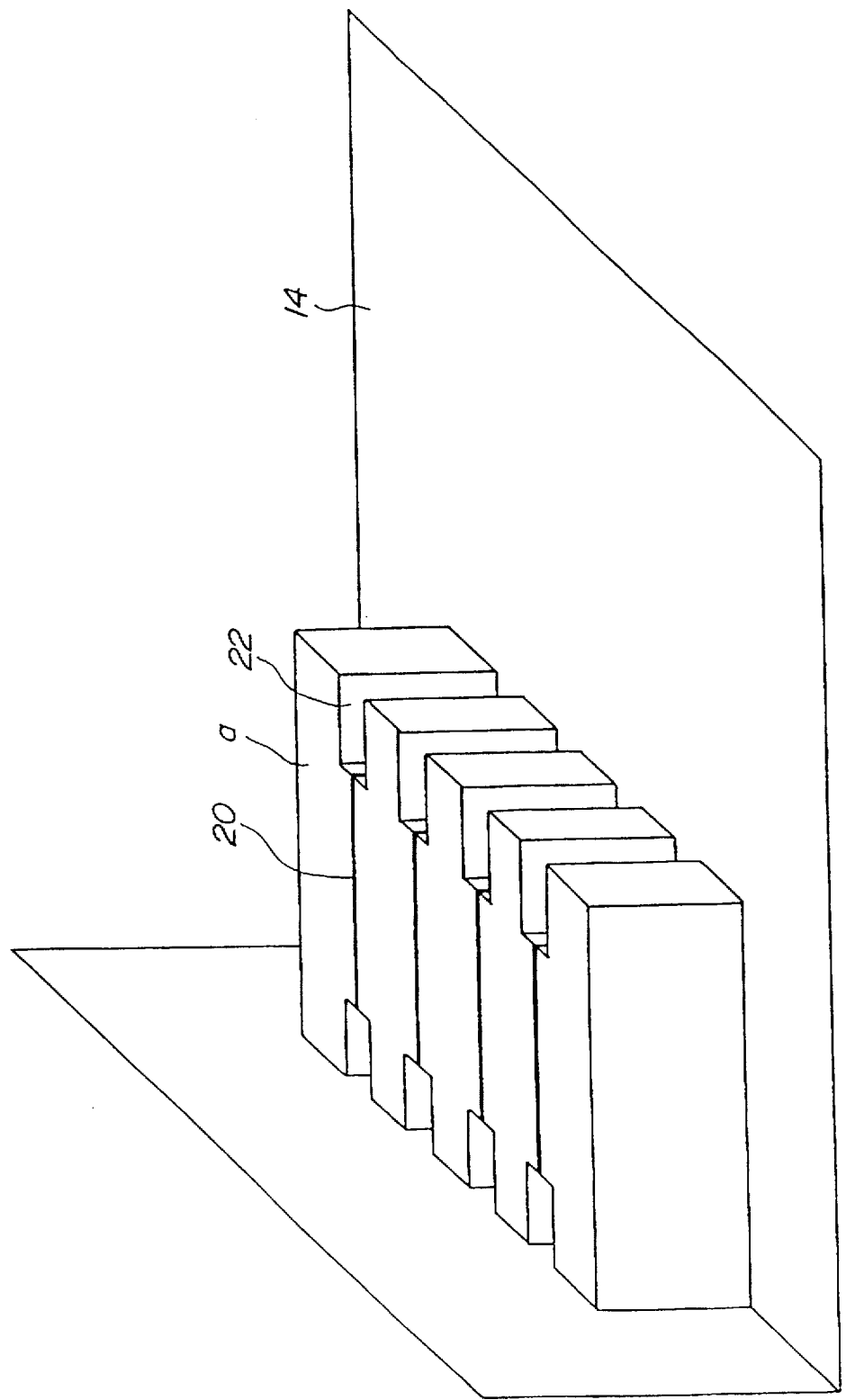
FIG. 15 is a perspective diagram illustrating the manner in which the product shown by FIG. 14 is packaged with wrapping paper.

In packaging, the product (a) is placed on wrapping paper (14) with said grooves (22) parallelly arranged on the transversely opposite sides as shown by FIG. 15. Also in this case, the respective partitions are put closely so that the splits are practically invisible.

Figure 16:
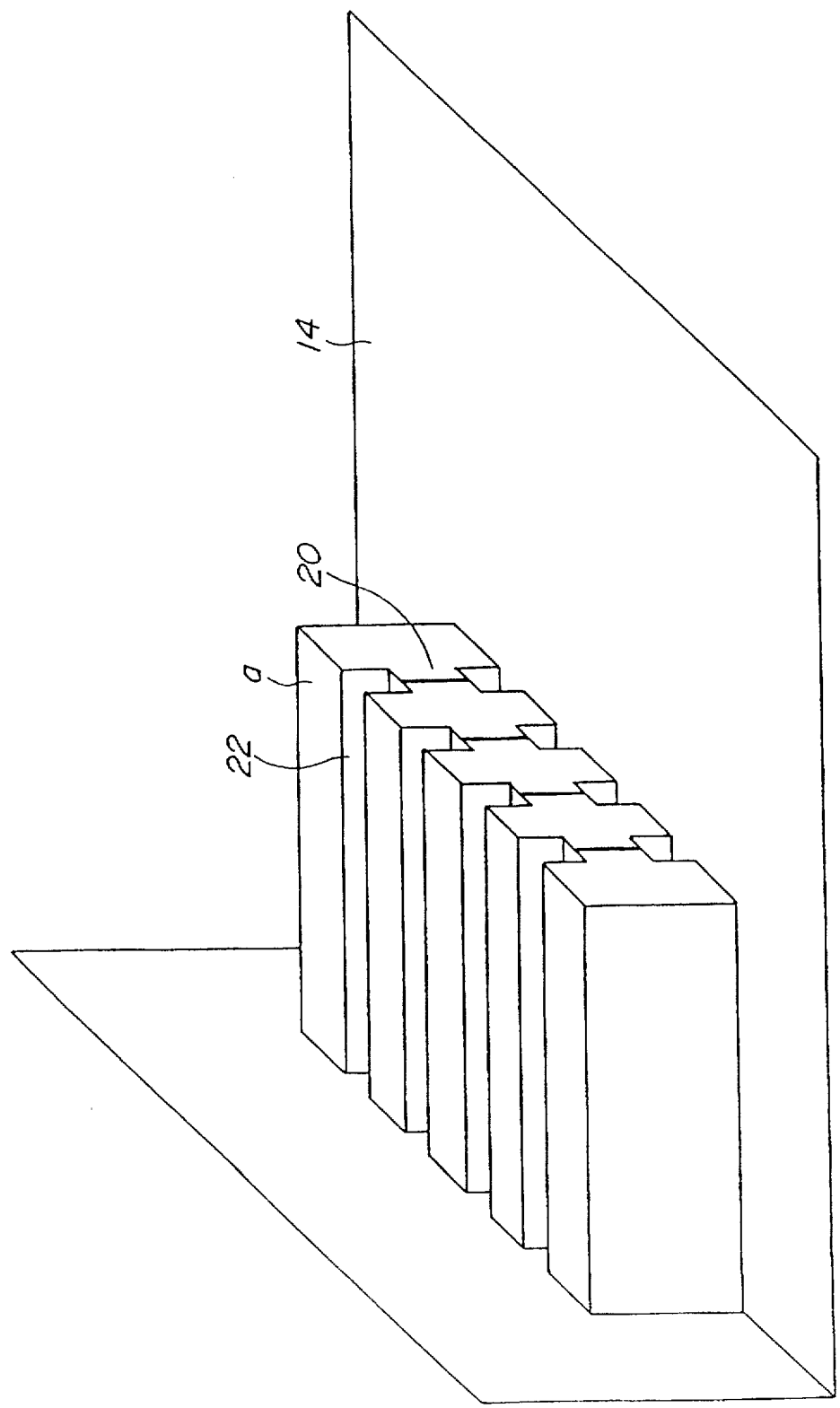
FIG. 16 is a perspective diagram illustrating the manner in which the product obtained according to the invention but different from the product shown by FIG. 15 is packaged with wrapping paper.

Depending on the ratio between lengths of respective sides defining the bottom and the height of the mold (M), it is also possible to place the product (a) on wrapping paper (14) and to package it so that the grooves (22) are parallelly arranged on vertically opposite sides of the product (a), as shown by FIG. 16.

FIG. 17 illustrates a process for continuously preparing the product by utilizing a turntable (15) adapted to be stepwise rotated by every 90°. More specifically, four steps of filling fat or oil food in emulsion form into the mold→transfer→discharge/precut of fat or oil food in emulsion form→transfer are repeated.

The mold (M) is filled by a feeder (16) with fat or oil food in emulsion form as the turntable (15) is rotated by 90° to station A. The mold (M) thus filled with fat or oil food in emulsion form is transferred to station B and held here as the turntable (15) is further rotated by 90°. Then, the turntable (15) is further rotated by 90° and thereby the mold (M) is transferred to station C where fat or oil food in emulsion form is discharged from the mold (M). This empty mold (M) is transferred to station D as the turntable (15) is further rotated by 90° and held here and then returns to the initial station A as the turntable (15) is rotated by a final 90°. While the feeder (16) of fat or oil food in emulsion form is illustrated in an enlarged scale for convenience, this feeder (16) is provided below station A.

Figure 18:
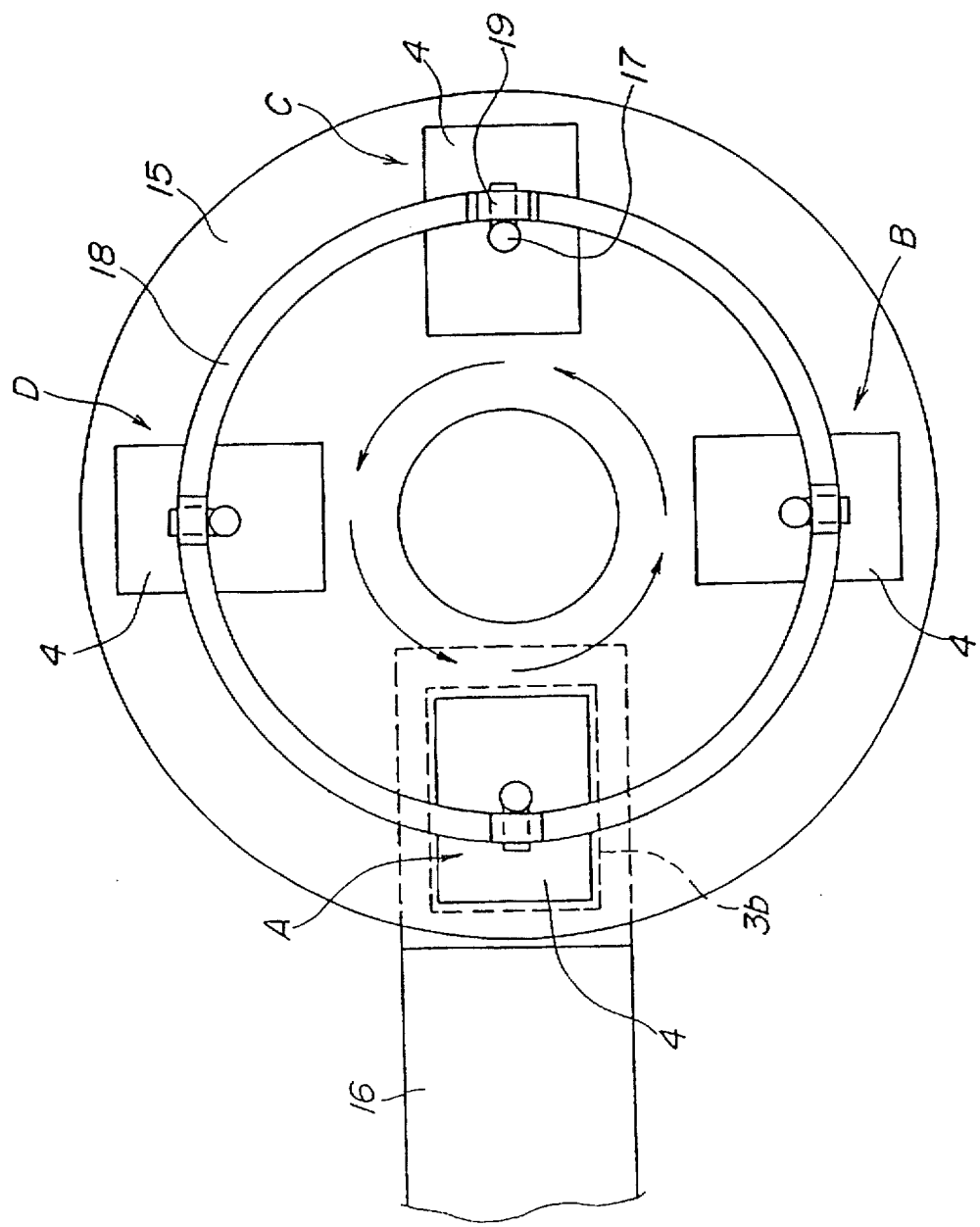
FIG. 18 is a diagram illustrating the molds placed on a turning table equipped with lift means for the extrusion die as viewed from above the top of the inventive apparatus.
Figure 19:
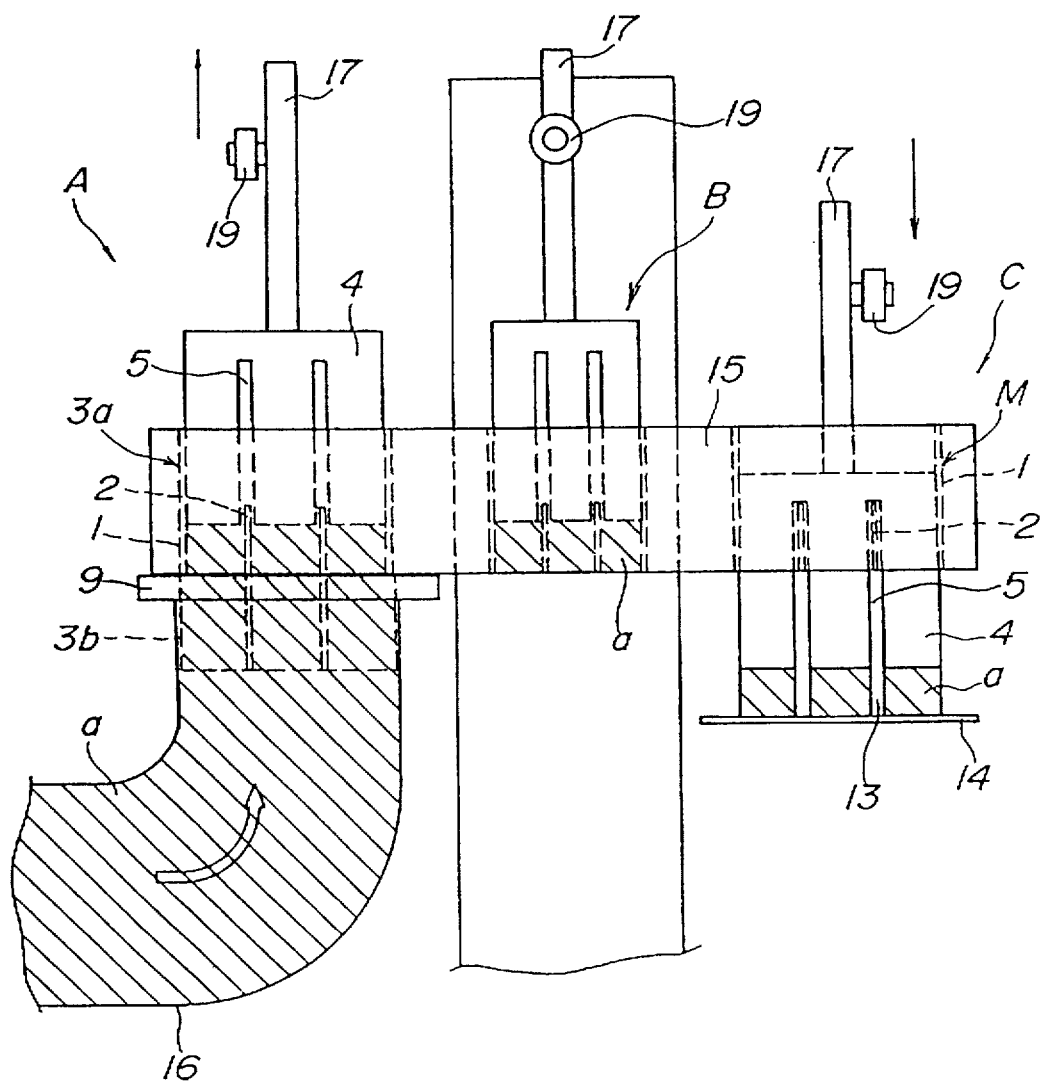
FIG. 19 is a schematic side sectional view corresponding to FIG. 18.

FIGS. 18 and 19 illustrate the turntable (15) adapted to be rotated stepwise by every 90 just like the turntable (15) shown by FIG. 17. Four steps of filling→transfer→discharge/precut→transfer are repeated to achieve the process for continuously preparing the precut unit products of fat or oil food in emulsion form.

Specifically, the mold (M) is filled with fat or oil food in emulsion form at station A and the mold (M) thus filled with fat or oil food in emulsion form is held at station B. Then the discharge/precut is performed at station C and the empty mold (M) is transferred again to station A.

A rod (17) of the extrusion die (4) is provided with a cam roller(19) which is biased downward under the effect of a spring (not shown) to be maintained in contact with a stationary guide (18). Thus, the rod (17) is vertically moved following a profile of said guide (18) as the turntable (15) is rotated.

In an arrangement illustrated by FIG. 19, also the feeder (16) of fat or oil food in emulsion form provided below the mold (M) is a partitioning frame (3b) in operatively associated with the partitioning frame (3). Such arrangement allows fat or oil food in emulsion form to be smoothly fed into the mold (M) overlying the feeder (16).

In both arrangements illustrated by FIGS. 17 and 18, the wire cutter means (12) is used to level off the top end of the fat or oil food in emulsion form at the discharge/precut station.

The turntable (15) is stepwise rotated every 90° and each cycle of the process is completed by four steps in the arrangement illustrated by FIGS. 17 and 18. However, the unit angle of rotation is not limited to 90°. For example, two steps of filling and discharging or four steps of filling, transfer, discharge/precut and transfer can be achieved by rotation of a single unit angle. In this case, the turntable will be stepwise rotated by every 360/2n°. Thus the unit angle of rotation can be selectively set depending on the particular placement of the respective stations (It should be understood that n represents an integer).

While the case has been described above in which there are provided a single feed station and a single discharge/precut station, respectively, there may be provided plural feed stations as well as plural discharge/precut stations. It is assumed, for example, that the unit angle of rotation is set to 45° and there are provided a pair of feed stations and a pair of discharge/precut stations. In this case, said four steps will be completed as the turntable is rotated by 180° and thereby the processing capability of the single turntable (15) will be doubled.

Four experimental examples utilizing the invention will be described below.

EXAMPLE 1

The mold (M) of FIG. 10 was mounted on the turntable (15) shown by FIG. 19 and butter prepared by the conventional process as divided into rectangular blocks.

The mold (M) was filled with butter and the turntable (15) was stepwise rotated by every 90°. In this manner, the steps of filling→transfer→discharge/precut→transfer were repeated and thereby precut products were continuously obtained.

As means to precut the butter, the mold (M), the extrusion die (4) and the partitioning frame shown by FIGS. 10 and 19 were employed. To enhance filling efficiency, the partitioning frame (3b) shown by FIG. 19 was provided on the forward end of the butter feeder (16), i.e., below the mold (M). The partitioning frame (3a) was dimensioned to have a short side of 6.5 cm and a long side of 9.5 cm and divided by the partitioning plates (2) having a height of 6 cm into 9 partitions. Each partition had a rectangular bottom defined by a short side of 2 cm and a long side of 3 cm.

The extrusion die (4) was dimensioned to be slidable movable in the vertical direction in contact with the inner surface of the partitioning frame (3a). To achieve this, the width of each groove was dimensioned to be wider than the thickness of the partitioning plates (2) by 0.4 mm. The lower partitioning frame (3b) presented the same cross-sectional area as the upper partitioning frame (3a) and was divided by the partitioning plates (2) having a height of 5 cm into nine partitions. During the step of filling the mold (M) with butter, these upper and lower partitioning frames (3a) (3b) were operatively associated with each other in close contact.

Butter prepared by the conventional process was fed by the screw feeder into the mold (M). The extrusion die (4) was moved upward as the mold (M) was filled with butter. The position of the stopper means was adjusted so that the extrusion die (4) may be stopped when it was moved upward by 5.4 cm and thereby the weight of butter per unit partition reached 30 g. After the mold (M) had been filled with a predetermined quantity of butter, the turntable (15) was rotated by 90° and the next mold (M) was filled with butter. The turn table was further rotated by 90° to the position spaced by 180° from the filling station, at which the extrusion die (4) was forcibly lowered to discharge butter from the mold (M). After butter had been completely extruded onto wrapping paper (14), the upper end of butter was cut off from the extrusion die (4) by the wire cutter (12) and packaged with the precuts (13) separating the respective partitions which are close to one another.

This product of butter was divided into nine partitions by the grooves (5) having the same width as the thickness of the partitioning plates (2). Both the shape and the weight of butter per unit partition was same. The weight of butter per unit partition was uniformly 30 g.

The extrusion die (4) being slidably movable in contact with the partitioning frames (3a) (3b) allowed the product of butter to be divided in uniform shape and weight.

EXAMPLE 2

The extrusion die (4) and the mold (M) of FIG. 8 were mounted on the turntable (15) of FIG. 19 to obtain a product divided into trapezoidal pillars but having a portion (a') left to be free from formation of the precuts. Butter prepared by the conventional process and hardened was fluidized by the butter homogenizer.

Butter was filled into the mold (M). The turntable was stepwise rotated by every 90°. Specifically, four steps of filling→transfer→discharge/precut→transfer were repeated and thereby the precut product was continuously obtained.

The extrusion die (4) and the partitioning frame (3a) shown by FIG. 8 were used to form the precuts in the product of butter. The partitioning frame (3a) was defined to have a short side of 6.5 cm and a long side of 9.5 cm and divided by the partitioning plates (2) having a height of 4 into eight partitions. The partitioning plates (2) forming the partitioning frame (3a) were supported at a level lying 5 mm above the lower end of the partitioning frame (3). Each partition presented a trapezoidal cross-section defined by a top side of 0.6 cm, a bottom side of 2.35 cm and a height of 4.6 cm. The size of the extrusion die (4) was selected so as to be movable in slidable contact with the inner surfaces of the partitioning frame (3a) in vertical direction. To achieve this, the grooves (5) were dimensioned to have a width larger than the thickness of the partitioning plates (2) by 0.4 mm.

Butter prepared by the conventional process was fed by the screw feeder into the mold (M). The extrusion die (4) was filled with butter. The position of the stopper means was adjusted so that the extrusion die (4) may be stopped when it was moved upward by 4 cm and thereby the weight of butter per unit partition reached 25 g. After the mold (M) had been filled with a predetermined quantity of butter, the turntable (15) was rotated by 90° and the next mold (M) was filled with butter. The turntable (15) was further rotated by 90° to the position spaced by 180° from the filling station, at which the extrusion die (4) was forcibly lowered to discharge butter from the mold (M). After butter had been completely extruded onto wrapping paper (14), the upper end of butter was cut off from the extrusion die (4) by the wire cutter (12) and packaged.

This product of butter was divided into eight partitions by the grooves (5) having the same width as the thickness of the partitioning plates (2) but had a lower portion left to be free from formation of the precuts. The portion having no precut was readily split. Both the shape and the weight of butter per unit partition thus split was same. The weight of butter per unit partition was uniformly 25 g.

The product was thus partitioned by the precuts in uniform shape and weight leaving a portion of its thickness free from formation of the precuts. This was achieved by providing a difference in level between the bottoms of the partition plates (2) and the surface of the turntable (15). The extrusion die (4) slidably movable in contact with the inner surfaces of the partitioning frame (3a) also contributed to this purpose.

EXAMPLE 3

The same feeder (16), extrusion die (4) and partitioning frames (3a) (3b) as those used in EXAMPLE 1 were used. The precuts were formed after margarine of hard type prepared by the conventional process and hardened had been fluidized by the butter homogenizer.

After the mold (M) had been filled with margarine, the turntable (15) was stepwise rotated. A lifting mechanism adapted to lift the extrusion die (4) was provided on the way to the discharge station.

Fluidized margarine was fed by the screw feeder into the mold (M). The extrusion die (4) was moved upward as the mold (M) was filled with margarine. The stopper means was adjusted so that the extrusion die (4) may be stopped when it was moved upward by 2 cm and thereby the mold is filled with a predetermined quantity of margarine, and the turntable (15) was rotated by 90°. During this rotation, the extrusion die (4) was further moved upward by 5 mm and the bottom of the extrusion die (4) was spaced from the bottom of the turntable (15) by 2.5 cm. Simultaneously, margarine filling the mold (M) was also moved upward and the lower portions of the partitioning plates (2) were exposed out of the margarine.

At the position angularly spaced from the filling station, the extrusion die (4) was forcibly lowered to discharge margarine from the mold (M). After margarine had been completely extruded onto wrapping paper (14), the top end of margarine was cut off from the extrusion die (4) by the wire cutter (12). Then the product was packaged with the partitions close to one another so that the precuts (13) were practically invisible.

This product of margarine was divided into nine partitions by the grooves (5) having the same width as the thickness of the partitioning plates (2). Both the shape and the weight of margarine per unit partition were uniform and the weight per unit partition was 11 g.

Division of margarine into the partitions being uniform in both the shape and the weight was achieved by the unique arrangement as follows: The extrusion die (4) was lifted to a level higher than the level during the step of filling as the extrusion die (4) was transferred by rotation of the turntable (15). Thereby the extrusion die (4) pulled margarine up until the bottoms of the partitioning plates (2) was exposed as the extrusion die (4) was moved in slidable contact with the inner surfaces of the partitioning frame (3a).

EXAMPLE 4

The mold (M) of FIG. 10 was mounted on the slide plate (7) shown by FIG. 3 and precut block butter was prepared from butter prepared by the conventional process.

At the filling station, the mold (M) was filled from its underside with butter prepared by the conventional process. Then, the mold (M) was transferred to the discharge station at which butter was extruded by the extrusion die (4). Four steps of filling→transfer→discharge/precut→transfer were repeated by reciprocation of the slide plate (7) and thereby precut butter was continuously obtained.

More specifically, the partitioning frame (3) divided into nine partitions each configured in a square defined by each side of 11 cm is assembled inside the outer frame (1) to form the mold (M). The grooves (5) formed in the extrusion die (4) had a width larger than the thickness of the partitioning plates (2) by 1 mm.

The mold (M) within which the extrusion die (4) had, been lowered to the bottom of the mold (M) was placed at the filling station and butter was fed into the mold (M) by the feed pump (10). The extrusion die (4) was moved upward as it was filled with butter. The stopper means was adjusted so that the extrusion die (4) may be stopped when a level of 19.5 cm was reached and the total weight of butter reached 20 kg. After the mold (M) was filled with a predetermined quantity of butter, the slide plate (7) was transferred to the discharge station. At this station, the extrusion die (4) was forcibly lowered to discharge butter from the mold (M) onto wrapping paper (14). The top end of butter was cut off by the wire cutter (12) and packaged as an individual product.

The product of butter obtained in this manner had nine partitions divided by the grooves (5) having the same width as the thickness of the partitioning plates (2). The weight of butter per unit partition was in a range of 2.23 kg to 2.25 kg.

The product was frozen at a temperature of −15° C. in the refrigerator. Thereafter the product in its frozen state as was unwrapped. It was found that the product still in the frozen state can be easily divided into the respective partitions.

The product thus divided was packaged again with wrapping paper (14) and preheated in a pyrostat at a temperature of 13° C. 32 hours after, the temperature at the core portion of each block was determined to be substantially uniform in a range of 12.6° C. to 12.8° C. At such temperature, each block of butter was sufficiently soft enough to be readily cut.

For the purpose of comparison, non-precut block butter of 20 kg was completely frozen and then preheated under the same condition. It was found that nine days are necessary for the core portion of this non-precut block butter to reach said temperature (12.6° C.–12.8° C.).

As will be apparent from this comparison, it is difficult for un-precut block butter to be preheated within a reasonably short period. This necessarily decreases the working efficiency as well as the utilizing efficiency of refrigerator space. In contrast with this, precut butter provided by the invention is readily split even in its frozen state. In addition, the invention allows the preheating required for thawing to be achieved within a reasonably short period. These advantages are extremely valuable in practical use.

It should be understood that the invention is not limited to the specific embodiments as have been described hereinabove but defined by the appended claims. For example, the type of precuts formed in the product is selective. Specifically, the precuts may fully extend from the top to the bottom of the product or partially extend so as to leave the upper or lower portion of the product to be free from formation of the precuts. Such selection depends on the configuration of the partitioning frame (3) relative to the mold (M) and the manner in which the frame (3) is attached to the mold (M). Accordingly, these designing factors may be optionally modified without departing from the spirit and scope of the invention.

Industrial Use

The invention allows the block-like product of fat or oil food in emulsion form to be easily formed with precuts. The product thus formed with the precuts can be readily divided even at a low temperature immediately after it has been taken out from the refrigerator or even in its frozen state. In this way, just the quantity to be used can be divided off. The product can be readily split while it is still in its hard state at a low temperature, and therefore it is unnecessary at all to leave it at a room temperature and to wait long until it is soft. This means that there is no apprehension that a remaining portion of the product might be deteriorated in its quality.

Block-like butter or margarine for household use has conventionally been offered in the form of a block and could not be formed with the precuts as in the case of sheet-like products. The invention has effectively solved this problem.

As will be apparent from the foregoing description, the invention allows the bulky product for commercial consumption to be easily split. This contributes to quality preservation, improved working efficiency and efficient utilization of storage space. The invention also provides such advantages to household uses.

What is claimed is:

1. A process for preparing a precut, solid water-in-oil emulsion, comprising:
   1) providing a mold having an outer frame and a plurality of configured partitioning plates disposed within the outer frame;
   2) at least partially filling the mold with a fluid form of the emulsion so as to form precuts in the emulsion corresponding to the partitioning plates;
   3) allowing the emulsion to set;
   4) advancing an extrusion die into the mold the extrusion die having grooves configured complimentary to the configuration of the partitioning plates so as to receive the partitioning plates therein; and
   5) discharging the set emulsion from the mold by at least partially passing the extrusion die through the mold so as to discharge the set emulsion with the precuts therein.

2. The process of claim 1, wherein the emulsion is butter or margarine.

3. The process of claim 1, wherein the set discharged emulsion is disposed on a wrapping for wrapping thereof.

4. The process of claim 3, wherein the extrusion die advances into the mold from an above vertical position and the discharged set emulsion drops into the wrapping by gravity.

5. The process of claim 1, wherein the filling is at a filling station and the discharging is at a discharge station and after the filling of the mold, the mold is transferred to the discharge station.

6. The process of claim 5, wherein the mold is on a turn table and the mold is transferred to the discharge station by rotation of the turn table.

7. The process of claim 6, wherein there are a plurality of filling stations and a plurality of discharge stations and the turn table is rotated from a filling station to a discharge station.

8. The process of claim 1, wherein the partitioning plates are arranged such that the precuts extend through a dimension of the set emulsion and the discharged set emulsion is in the form of a plurality of individual precut portions.

9. The process of claim 1, wherein the partitioning plates are arranged such that the precuts do not extend through a dimension of the set emulsion and the discharged emulsion is in the form of a single molding with precuts therein.

10. The process of claim 1, wherein the emulsion is set by freezing.

11. An apparatus for preparing a precut, solid water-in-oil emulsion, comprising:
   1) a mold having an outer frame and a plurality of configured partitioning plates disposed within the outer frame;
   2) filling means for at least partially filling the mold with a fluid form of the emulsion so as to form precuts in the emulsion corresponding to the partitioning plates;
   3) an extrusion die having grooves configured complimentary to the configuration of the partitioning plates so as to receive the partitioning plates therein; and
   4) discharge means for at least partially moving the extrusion die through the mold so as to discharge a set form of the emulsion with the precuts from the mold.

12. The apparatus of claim 11, wherein the filling means is a nozzle.

13. The apparatus of claim 11, wherein the partitioning plates have prominences extending along a height of the partitioning plates.

14. The apparatus of claim 11, wherein at least some of the partitioning plates have a height less than a height of the outer frame such that a portion of the emulsion in the mold is free from precuts.

15. The apparatus of claim 11, wherein the grooves have a depth in the extrusion die larger than heights of the partitioning plates whereby the partitioning plates constitute a stop for the extrusion die.

16. The apparatus of claim 11, wherein the filling means is a feeder underlying the mold and operably connected thereto.

17. The apparatus of claim 11, wherein the filling means is at a filling station and the discharge means is at a discharge station and after filling the mold, the mold is transferred to the discharge station.

18. The apparatus of claim 17, wherein the mold is on a slide plate which is movable from the filling station to the discharge station.

19. The apparatus of claim 17, wherein the mold is on a turn table and the turn table is rotatable from the filling station to the discharge station.

20. The apparatus of claim 18, including a leveling means to remove excess emulsion from the mold as the mold is transferred from the filling station to the discharge station..

21. The apparatus of claim 17, including a leveling means to remove excess emulsion from the mold as the mold is transferred from the filling station to the discharge station.

22. The apparatus of claim 19, wherein a guide rail spaced above the turn table is configured for moving the extrusion die into the mold at the discharge station, for discharging the precut set emulsion and for moving the extrusion die out of the mold after the precut set emulsion is discharged from the mold, as the turn table is rotated.

23. The apparatus of claim 16, wherein a partitioning frame is also provided within the feeder underlying the mold, so a s to be operatively associated with the partitioning frame within the mold.

* * * * *